3,389,958
PROCESS FOR THE MANUFACTURE OF ALKALI METAL TRIMETAPHOSPHATES
Gero Heymer, Knapsack, near Cologne, Joseph Cremer, Hermulheim, near Cologne, and Heinz Harnisch, Lovenich, near Cologne, Germany, assignors to Knapsack Aktiengesellschaft, Knapsack, near Cologne, Germany, a corporation of Germany
Filed July 2, 1965, Ser. No. 469,195
Claims priority, application Germany, July 17, 1964,
K 53,496
9 Claims. (Cl. 23—106)

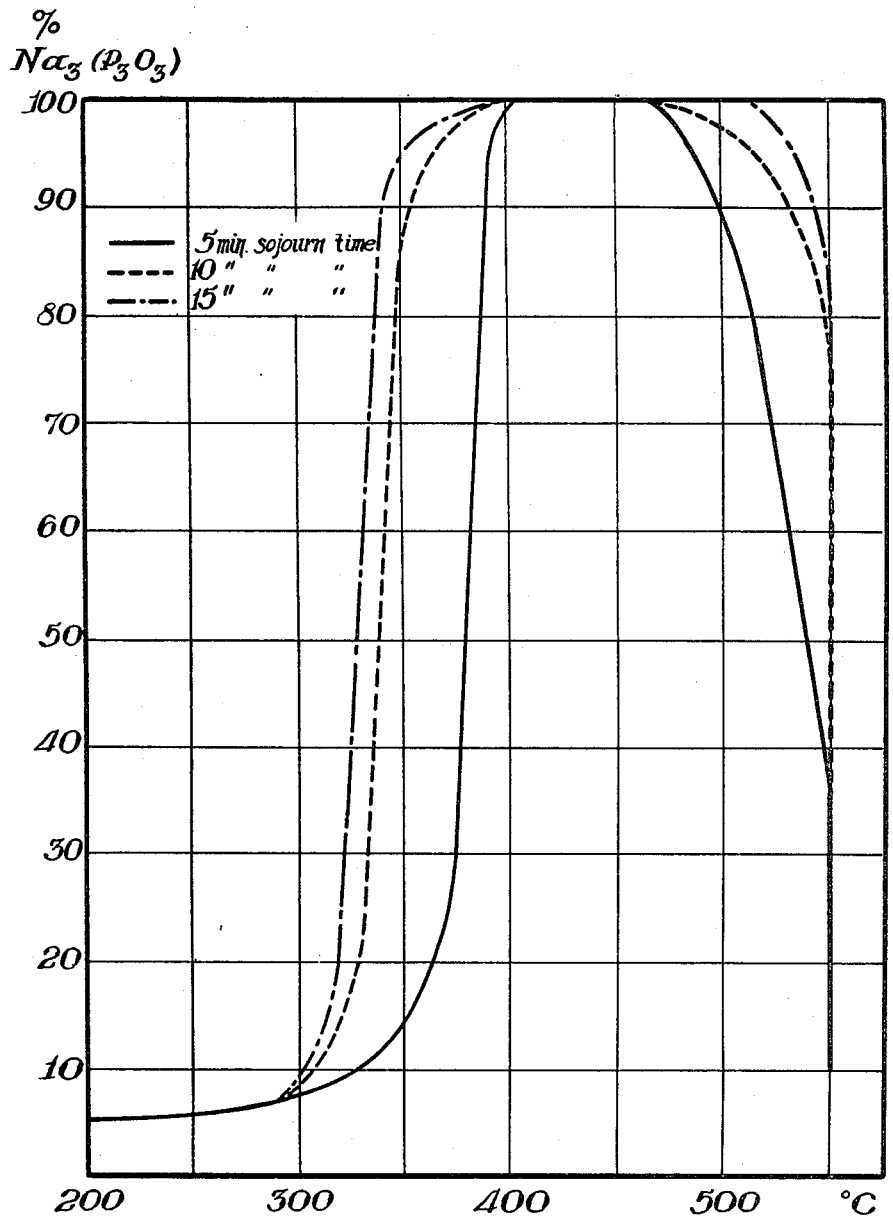
Sodium Trimetaphosphate content as a function of the temperature at various sojourn times of the solidified melt United States Patent Office 3,389,958
Patented June 25, 1968

ABSTRACT OF THE DISCLOSURE

Alkali metal trimetaphosphates are made by introducing an alkali metal compound having a volatile anion into a flame fed with phosphorus and an oxygen-containing gas with the resultant formation of a phosphate melt. The alkali metal compound and phosphorus are used in a quantitative ratio sufficient to produce a phosphate melt containing alkali metal oxide and $P_2O_5$ in a ratio of 1:1. The phosphate melt is immediately solidified, and then maintained for a period from 1 to 30 minutes at temperatures between 300 degrees C. and below the melting point of the trimetaphosphate produced and ultimately cooled down to ambient temperature. The solidified phosphate melt may preferably be maintained for a period of 5 to 10 minutes at a temperature between 350 degrees C. and below the melting point of the trimetaphosphate produced. It may be advantageously solidified on an endless belt resistant to the attack of the melt, which is conveyed through a heat-insulated tunnel as soon as the solidified melt has reached the temperature between 300 degrees C. and the melting point of the trimetaphosphate produced. The length of the tunnel and the belt velocity may advantageously be adapted to one another to ensure a sojourn time of the solidified melt in the tunnel of 1 to 30 minutes. The phosphate melt may be efficiently collected in containers having a capacity of more than about 100 liters and cooled down therein to ambient temperature.

The present invention provides a process for the manufacture of alkali metal trimetaphosphates.

Alkali metal trimetaphosphates have been prepared heretofore by processes of the type, wherein phosphoric acid is neutralized with an alkali and the resulting phosphates, which are preferably monosodium phosphate or mixtures of mono- and disodium phosphates, are tempered for a prolonged period at temperatures varying between 300° C. and the melting point of the alkali metal trimetaphosphate, advantageously at temperatures above 350° C., so as to enable isolated orthophosphate tetrahedrons to condense with ring formation by the intermolecular splitting off of water.

Considerable disadvantages are associated with those processes. Firstly, they comprise a plurality of single steps which include preparation of phosphoric acid, neutralization, crystallization of phosphate and successively tempering the phosphate to obtain trimetaphosphate, and secondly they have a very poor energy balance. Burning phosphorus to obtain $P_2O_5$, hydrating the $P_2O_5$ to obtain $H_3PO_4$ and neutralizing the $H_3PO_4$ call for dissipation, whereas tempering the phosphates calls for the supply of considerable amounts of calorific energy.

Still further, the above processes give rise in a scientifically undetermined manner to the formation of varying amounts of insoluble and therefore very undesirable long chain polyphosphates, such as represented by Maddrell's and Kurrol's salt. Extensive investigations have been made and various processes developed and described in quite a number of patent applications, which all aim at reducing the content of those insoluble phosphates in the alkali metal trimetaphosphate. However, these processes are even less favorable for economic commercial production of alkali metal trimetaphosphates because the steps necessary for reducing the content of insoluble phosphate add to the poor energy balance and the numerous working steps of these processes.

It has also been proposed to dissolve insoluble phosphate crystallites by melting the raw material or tempered product and causing alkali metal trimetaphosphate to crystallize from the melt so obtained. However, relatively long melting periods at temperatures approaching 800° C. are necessary to efficiently dissolve those insoluble phosphates. This means firstly an energy balance which becomes even less favorable and secondly considerable corrosion problems.

The present invention unexpectedly provides a process which enables alkali metal trimetaphosphate to be prepared in simple manner and under very favorable energetic conditions, which comprises introducing an alkali metal compound having a volatile anion, e.g. an oxide, hydroxide, carbonate, chloride or nitrate, into a flame fed with phosphorus and an oxygen-containing gas, advantageously air, allowing the resulting phosphate melt which forms in conventional manner to solidify and maintaining it for a period longer than 1 minute, preferably for a period of 5 to 10 minutes at a temperature above 300° C. preferably above 350° C., but below its solidification temperature, and ultimately allowing the solidified melt to cool down to normal temperature.

The alkali metal compounds can be used in the form of a solution or in solid form, and the phosphorus is preferably employed in the form of a melt.

Pure alkali metal trimetaphosphate is more especially obtained when the starting products are used in a quantitative ratio sufficient to produce a phosphate melt containing alkali metal oxide and $P_2O_5$ in a ratio of 1:1.

Considerable advantages are associated with the new process which inter alia include utilization of the considerable calorific energy such as set free by burning phosphorus, which means that no additional energy is necessary for making trimetaphosphate. Furthermore, the process is easy to carry out continuously in a single step. This latter goal can be achieved, for example, by allowing the phosphate melt to cool and thus solidify on an endless belt resistant to melt attack and then causing the belt—as soon as the solidified melt has reached the temperature at which the melt shall be converted into trimetaphosphate—to travel through a heat-insulated tunnel. Belt velocity and tunnel length should be so adapted to one another that the time during which the melt is allowed to remain in the tunnel is sufficient to produce complete transformation into trimetaphosphate, that is to say the melt should be allowed to remain in the tunnel for a period of 1 to 30 minutes, preferably 5 to 10 minutes. The sojourn time is primarily determined by the thickness of the solidified melt layer on the belt. The solidified melt is actually transformed into alkali metal trimetaphosphate within a very short period, say of 1 minute. Since however, the melt and solidified melt both have a very poor heat conductivity, there is always a temperature gradient in the layer from the internal layer portion to the layer surface portion. This means, for example, that the surface layer portion may already have solidified and undergo transformation when the internal layer portion still has a temperature above the solidification point of the melt. In other words, thicker layers call for longer sojourn times in the tunnel than thinner layers.

These associations are illustrated by the curves shown in the accompanying diagram. Melt samples were quenched after a sojourn time in the tunnel as indicated in the diagram so as to freeze their particular state at that moment. The content of alkali metal trimetaphosphate represents the average value found in the outer skin or surface layer portion and in the internal layer portion. All the yield curves decrease towards high temperatures, i.e. the more the shorter the sojourn time, because short sojourn times mean internal layer portions too hot to permit transformation into trimetaphosphate. However, the range of temperatures applicable to effect the transformation varies within rather wide limits, and pure alkali metal trimetaphosphate can thus also be obtained for shorter sojourn times with layers not too thick. To this end, the layer should be allowed to remain in the tunnel at a low temperature within that temperature range which will result in a greater temperature gradient towards the surface layer portion with consequently more rapid cooling of the internal layer portion to a temperature suitable for transformation.

Although an endless belt requires a minimum of work as the alkali metal trimetaphosphate is continuously produced to be supplied directly to a grinder and/or discharge place, the process of the present invention also enables pure alkali metal trimetaphosphate to be produced likewise in a single stage for even lesser expenditure of apparatus but with separate work-up stages by allowing the melt to run into large containers to gradually solidify therein and cool down to normal temperature with no special cooling. Due to the low heat conductivity of both the liquid and solidified melts the temperature range necessary to effect transformation is traversed within a sufficient period of time, which means that containers of appropriate dimensions with a capacity of more than 100 liters even permit omitting any heat insulation.

Apart from a surface layer portion about 2 to 5 mm. thick which contains small amounts of iron, the solidified and cooled block consists of pure alkali metal trimetaphosphate provided that the starting products were used in a quantitative ratio sufficient to produce a melt containing alkali metal oxide and $P_2O_5$ in a ratio of 1:1.

The following example serves to illustrate the invention:

EXAMPLE:

100 liters, corresponding to 171 kg., molten phosphorus were burnt per hour with the help of a multi-material nozzle in a graphite-lined reaction tower 6 m. high and 2 m. wide. 265 liters per hour 50% sodium hydroxide solution were atomized with 70 cubic meters air centrally through the nozzle. A total of 1000 to 1200 cubic meters/ hr. combustion air was used. Three two-component nozzles disposed concentrically around the multi-material nozzle served to atomize concurrently therewith about 300 liter/hr. scrubbing solution coming from the wet-scrubbing stage series-connected to the reaction tower. The solution contained, per liter, 215 grams $P_2O_5$ and 97 grams $Na_2O$. The water-white melt leaving the tower was allowed to run into thin-walled iron containers with a capacity of 200 liters, wherein the melt was allowed to gradually solidify at about 580° C. and cool down to normal temperature in the course of about 24 hours. The iron containers had dimensions permitting the solidified mass, while cooling, to traverse the temperature range of 580–350° C. within a period of more than 1 minute.

After the sheet iron jacket had been removed, the solidified blocks were freed from slight contaminations adhering to their surface, then crushed and ground. The ground material contained 99.2% alkali metal trimetaphosphate, 0.6% sodium pyrophosphate and about 0.2% sodium orthophosphate. The content of insoluble phosphates was less than 0.01%. The average yield was 558 kg. crude material and 539 kg. pure product per hour. This corresponded to a total yield of 95.8%.

We claim:

1. A process for the manufacture of alkali metal trimetaphosphates, which comprises introducing an alkali metal compound having a volatile anion into a flame fed with phosphorus and an oxygen-containing gas with the resultant formation of a phosphate melt, said alkali metal compound and the said phosphorus being used in a quantitative ratio sufficient to produce a phosphate melt containing alkali metal oxide and $P_2O_5$ in a ratio of 1:1, solidifying said phosphate melt immediately thereafter, maintaining the solidified melt for a period from 1 to 30 minutes at temperatures between 300 degrees C. and below the melting point of the trimetaphosphate produced, and ultimately cooling said phosphate melt down to ambient temperature.

2. A process as claimed in claim 1, wherein the alkali metal compound is used in solid form.

3. A process as claimed in claim 1, wherein the alkali metal compound is used in the form of a solution.

4. A process as claimed in claim 1, wherein the alkali metal compound is at least one substance selected from the group consisting of alkali metal oxides, hydroxides, carbonates, chlorides and nitrates.

5. A process as claimed in claim 1, wherein air is used as the oxygen-containing gas.

6. A process as claimed in claim 1, wherein liquid phosphorus is used.

7. A process as claimed in claim 1, wherein said solidified phosphate melt is maintained for a period of 5 to 10 minutes at a temperature between 350 degrees C. and below the melting point of the trimetaphosphate produced.

8. A process as claimed in claim 1, wherein said phosphate melt is solidified on an endless belt resistant to the attack of the melt, said endless belt is conveyed through a heat-insulated tunnel as soon as said solidified melt has reached a temperature between 300 degrees C. and the melting point of the trimetaphosphate produced, and the length of said tunnel and the belt velocity being adapted to one another to ensure a sojourn time of said solidified melt in the tunnel of 1 to 30 minutes.

9. A process as claimed in claim 1, wherein said phosphate melt is collected in containers having a capacity of more than about 100 liters and cooled down therein to ambient temperature.

References Cited

UNITED STATES PATENTS 3,168,373   2/1965   Hartlapp et al. _____ 23—106

FOREIGN PATENTS 1,044,226   9/1966   Great Britain.
1,194,383   6/1965   Germany.
1,199,246   8/1965   Germany.

OSCAR R. VERTIZ, *Primary Examiner.*

L. A. MARSH, *Assistant Examiner.*